US008285869B1

(12) United States Patent
Graetz (10) Patent No.: US 8,285,869 B1
(45) Date of Patent: Oct. 9, 2012

(54) COMPUTER DATA BACKUP OPERATION WITH TIME-BASED CHECKPOINT INTERVALS

(75) Inventor: Philip L. Graetz, Andover, MN (US)

(73) Assignee: Symantec Corporation, Mountain View, CA (US)

( * ) Notice: Subject to any disclaimer, the term of this patent is extended or adjusted under 35 U.S.C. 154(b) by 221 days.

(21) Appl. No.: 12/550,717

(22) Filed: Aug. 31, 2009

(51) Int. Cl.
*G06F 15/16* (2006.01)
(52) U.S. Cl. . 709/233; 709/232; 709/236; 707/999.202; 707/999.204; 711/162
(58) Field of Classification Search .......... 709/223–224, 709/231–233, 236–237; 707/999.201–999.204; 711/161–162
See application file for complete search history.

(56) References Cited

U.S. PATENT DOCUMENTS

| 6,549,921 B1 * | 4/2003 | Ofek | 707/999.204 |
| 6,718,361 B1 * | 4/2004 | Basani et al. | 707/999.202 |
| 6,747,993 B2 * | 6/2004 | Rinchiuso | 370/468 |
| 7,106,711 B2 * | 9/2006 | Otting et al. | 370/331 |
| 7,440,965 B1 | 10/2008 | Pruthi | |
| 7,546,325 B2 | 6/2009 | Kamei | |
| 7,702,851 B2 | 4/2010 | Satoyama | |
| 7,788,458 B2 * | 8/2010 | Galipeau et al. | 711/162 |
| 7,817,577 B2 * | 10/2010 | Kim et al. | 370/252 |
| 8,095,756 B1 * | 1/2012 | Somavarapu et al. | 711/162 |
| 2004/0243777 A1 * | 12/2004 | Suzuki et al. | 711/162 |
| 2005/0198359 A1 * | 9/2005 | Basani et al. | 709/232 |

* cited by examiner

*Primary Examiner* — Bharat N Barot
(74) *Attorney, Agent, or Firm* — Meyertons, Hood, Kivlin, Kowert & Goetzel, P.C.

(57) ABSTRACT

A system and method for controlling a backup operation to backup data from a source device to a backup storage device are described. Backup software creates checkpoints during the backup operation. Each checkpoint represents a point from which the backup operation can be re-started in case of failure. The backup software enables an administrator to specify a desired time interval between the checkpoints. The backup operation is performed using a backup protocol which uses a transfer frame size to determine when to create each checkpoint. The backup software translates the checkpoint time interval specified by the administrator into an appropriate transfer frame size in order to achieve the desired checkpoint time interval. The transfer frame size may be dynamically adjusted between each checkpoint.

18 Claims, 5 Drawing Sheets

COMPUTER DATA BACKUP OPERATION WITH TIME-BASED CHECKPOINT INTERVALS

BACKGROUND OF THE INVENTION

1. Field of the Invention

This invention relates to the field of data backup software for computer systems. More particularly, the invention relates to a system and method for implementing time-based checkpoint intervals for a backup operation.

2. Description of the Related Art

Computer systems often use backup software to backup data in order to protect the data against hardware failure or data corruption. Data may be stored on a storage device or in a logical volume of the computer system in the form of files. Backup techniques for backing up the files generally operate to create a backup image. One general backup technique is to backup the files at the file level, e.g., to include the files in the backup image on a file-by-file basis. In this technique, all the data for a given file is typically stored in the backup image, followed by all the data for the next file, etc. Another general backup technique is to backup the backup the files at the storage device block level rather than on a file-by-file basis. In this technique, the blocks may be sequentially read from the disk drive or other storage device on which the volume is stored and written to the backup image.

The backup image may be used to restore the data to the computer system in the event that it becomes necessary to do so, e.g., if the storage device on which the data is stored fails, if the data becomes corrupted, or if a user or software application needs to access the data is it existed at the time the backup image was created.

Large amounts of data may take a significant amount of time to backup. Failures sometimes occur during a backup operation so that the backup operation is interrupted before all of the data is backed up. In the case of a failure, the backup operation may be re-started. In order to avoid the need to re-start the entire backup operation from the beginning, the backup software controlling the backup operation may create checkpoints at various points during the backup operation. If the backup operation fails then it may be re-started from the most recent checkpoint. Thus, the data that was backed up before the most recent checkpoint was created does not have to be backed up again.

SUMMARY

Various embodiments of a system and method for controlling a backup operation to backup data from a source device to a backup storage device are described herein. According to some embodiments, a transfer frame size may be set to a particular size. The transfer frame size specifies an amount of data to be written between checkpoints of the backup operation. A desired checkpoint time interval which specifies a desired amount of elapsed time between checkpoints of the backup operation may be determined. An actual transfer rate at which data is transferred from the source device to the backup storage device may be measured. A new size to which to set the transfer frame size using the desired checkpoint time interval and the actual transfer rate may be determined. The transfer frame size may then be reset to the new size.

In further embodiments, prior to initiation of data transfer from the source device to the backup storage device, a transfer rate of data transfer from the source device to the backup storage device may be estimated. The desired checkpoint time interval and the estimated transfer rate may be used to determine the particular size to which to set the transfer frame size. The transfer frame size may be set to the particular size prior to initiation of data transfer from the source device to the backup storage device.

In further embodiments, the checkpoints of the backup operation may be created. Creating each respective checkpoint may include storing information enabling the backup operation to be re-started from the respective checkpoint.

In some embodiments the backup operation may be performed using a Network Data Management Protocol (NDMP). The transfer frame size may be a transfer frame size used by the Network Data Management Protocol to control an amount of data written between checkpoints of the backup operation.

In some embodiments the transfer frame size may be used by the backup storage device, and the transfer frame size may be set to the particular size by communicating with the backup storage device to cause the backup storage device to set the transfer frame size to the particular size. The transfer frame size may be reset by communicating with the backup storage device to cause the backup storage device to reset the transfer frame size.

In further embodiments, user input specifying the desired checkpoint time interval between checkpoints of the backup operation may be received. In some embodiments a graphical user interface for configuring backup operations may be displayed, and the user input may be received via the graphical user interface.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for controlling a backup operation to backup data from a source device to a backup storage device are described herein. The backup operation may be controlled by backup software. The backup software may create checkpoints during the backup operation, where each checkpoint represents a point from which the backup operation can be re-started in case of failure.

In some embodiments the backup operation may be performed using a backup protocol which uses a transfer frame to determine when to create each checkpoint. The transfer frame may be set to a particular size, e.g., a particular number of bits or bytes. The transfer frame size defines how much data to write before pausing to create a checkpoint. For example, suppose that the transfer frame size is set to 256 MB. After the first 256 MB of data have been transferred from the source device to the backup storage device, the backup software may pause the data transfer and create a first checkpoint. The backup software may then resume the data transfer. After the next 256 MB of data have been transferred from the source device to the backup storage device, the backup software may pause the data transfer again and create a second checkpoint. Thus, the backup operation may be continued in this manner by creating checkpoints at 256 MB intervals until all of the data has been transferred to the backup storage device for backup storage.

In some cases, an administrator of the system may be more interested in how much time elapses between checkpoints rather than how much data is backed up between checkpoints. Checkpoints are effectively a way to save time in the event of a backup operation failure. Thus, the administrator may want to ensure that no more than, say, 10 minutes elapse between checkpoints so that no more than 10 minutes of backup time will be lost if the backup operation fails. Similarly, the administrator may want to ensure that checkpoints are not created too often in time, as this would add unnecessary overhead to the backup operation without gaining any significant benefit.

If the backup software were to require the administrator to specify the checkpoint interval on the basis of a transfer frame size, it would be difficult for the administrator to know what transfer frame size to use in order to achieve the desired time interval between the checkpoints. For a given transfer frame size of N bytes, the amount of time required to transfer N bytes of data from the source device to the backup storage device can vary widely depending on such factors as the speed of the network connecting the source device and backup storage device, the rate at which the source device can read and transfer the data, etc. Moreover, these factors can vary depending on the load of the system so that it may take significantly longer to transfer the N bytes of data from the source device to the backup storage device if the system is heavily loaded, e.g., if there is a high amount of network traffic, or if the source device is busy performing other tasks in addition to the backup task.

Thus, in some embodiments, the backup software may enable the administrator to specify the intervals between the checkpoints on a time basis instead of a transfer frame size basis. For example, the backup software may receive user input specifying a desired time interval between the checkpoints, e.g., how much time the administrator of the system wants to elapse between the time when one checkpoint is created and the time when the next checkpoint is created. For example, the backup software may provide a graphical user interface that allows the administrator to specify a desired time interval of 15 minutes between checkpoints. Thus, the backup software may control the backup operation so that checkpoints are created at 15-minute intervals.

Although the backup software may allow the administrator to specify the checkpoint interval on a time basis, in some embodiments the backup operation may be performed using a backup protocol which does not support time-based checkpoint intervals, but instead uses a transfer frame to determine when to create each checkpoint. Thus, in some embodiments the backup software may translate the checkpoint time interval specified by the administrator into an appropriate transfer frame size in order to achieve the desired checkpoint time interval, e.g., as described in detail below.

Figure 1:
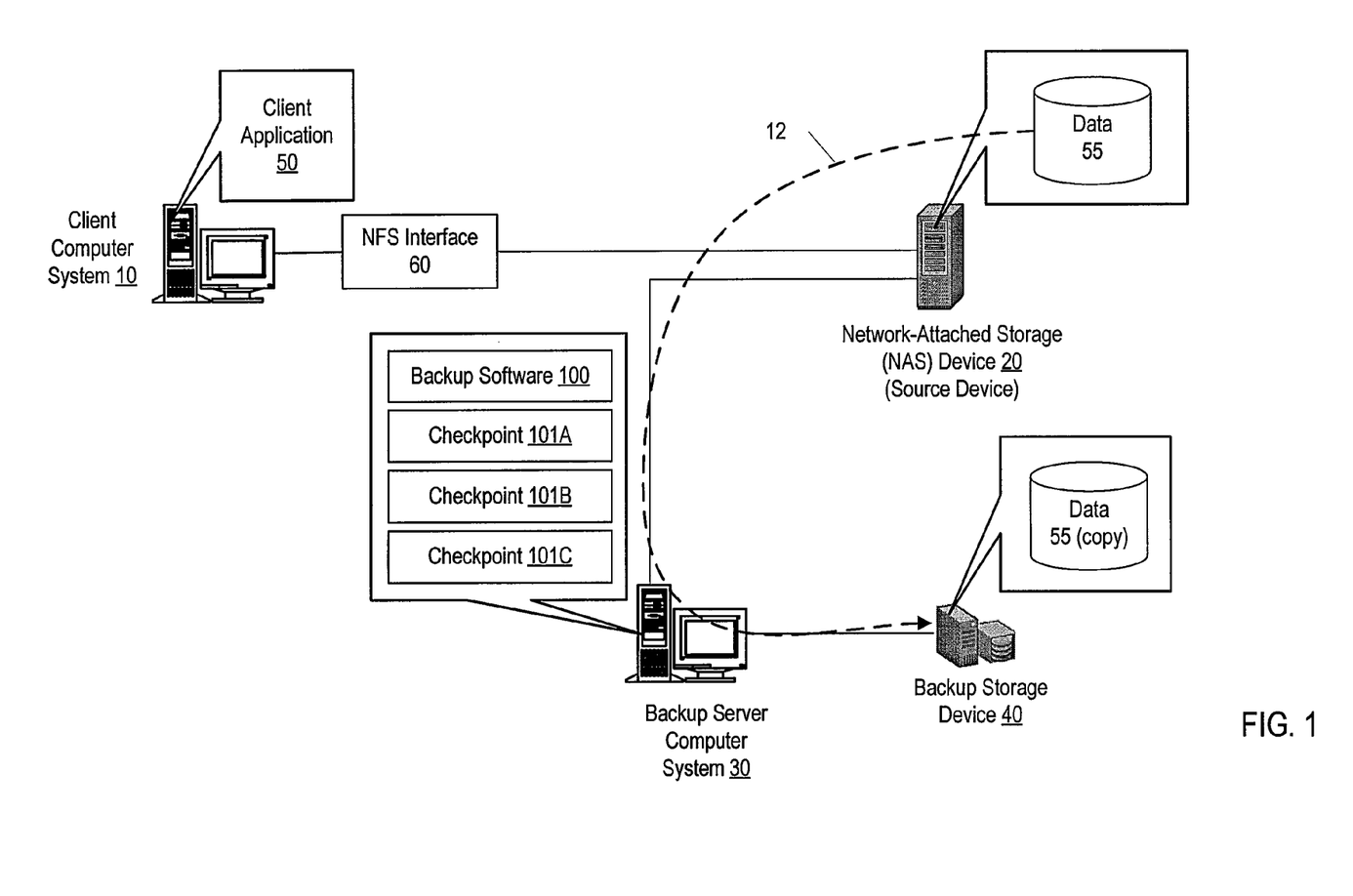
FIG. 1 illustrates an example of a system in which backup software executes to control a backup operation to backup data from a source device to a backup storage device.

FIG. 1 illustrates an example of the system according to one embodiment. The system includes a source device 20 on which data 55 is stored. The data 55 is the data to be backed up by the backup operation. In some embodiments the data 55 may be an entire storage volume in which a set of files are stored. In other embodiments the data 55 to be backed up may be a subset of the files within a storage volume.

In various embodiments the source device 20 may be any kind of device configured to store data. In the illustrated example, the source device 20 is a Network-Attached Storage (NAS) device. A NAS device is a computer specialized for providing file storage services to other computers on a network. For example, in FIG. 1 the NAS device is coupled to a client computer system 10 which executes a client software application 50. The NAS device may provide file storage services for files used by the client software application 50. The operating system and other software on the NAS device 20 provide the functionality of file systems, and access to files, and the management of these functionalities. A NAS device is typically not designed to perform general-purpose computing tasks other than file storage. NAS devices often do not have a keyboard or display, and are instead controlled and configured over the network, sometimes by accessing their network address from a web browser. A general-purpose operating system is usually not needed on a NAS device, and a stripped-down operating system with minimal functionality may be used instead. For example FreeNAS is a Free/open source NAS operating system, which is similar to the FreeBSD operating system but with all functionality not related to data storage stripped out. NAS systems include one or more hard disks, often arranged into logical, redundant storage containers or RAID arrays (redundant arrays of inexpensive/independent disks). The data 55 may be stored on one or more of the hard disks of the NAS device.

NAS devices provide data storage at the file system level. NAS devices use file-based protocols such as NFS (popular on UNIX systems), SMB/CIFS (Server Message Block/Common Internet File System) (used with MS Windows systems), or AFP (used with Apple Macintosh Computers. In the example of FIG. 1, files on the NAS device may be accessed through a Network File System (NFS) interface 60. In other embodiments the data 55 may be stored on a source device 20 which provides block-based data storage, such as a SAN (Storage Area Network) device for example.

The system also includes a backup storage device 40 to which the data 55 is backed up, e.g., in order to create a backup copy of the data 55 on the backup storage device. The backup copy of the data 55 can subsequently be restored to the source device 20 (or to another computer system) in the event that it becomes necessary to do so. In various embodiments the backup storage device 40 may be any kind of device configured to store data. In some embodiments the backup storage device 40 may be a tape drive (e.g., a device operable to store data on tape cartridges). In other embodiments the backup storage device 40 may be any other type of storage device, such as a disk storage unit (e.g., a device including one or more disk drives), optical storage device (e.g., a device operable to store data on optical media), flash memory storage device, etc.

In the illustrated embodiment the system also includes a backup server computer system 30 which executes backup software 100. The backup software 100 is executable to control the backup operation to backup the data 55 from the source device 20 to the backup storage device 40 according to the techniques described herein. The backup software 100 may create a plurality of checkpoints 101 during the backup operation. In this example, three checkpoints 101A, 101B and 101C are illustrated, although in various embodiments any number of checkpoints 101 may be created, e.g., depending on the checkpoint time interval specified by the administrator and the amount of time required to transfer the data 55 from the source device 20 to the backup storage device 40. The backup software 100 may create each respective checkpoint 101 by storing information enabling the backup operation to be re-started from the respective checkpoint 101, e.g., in the event that the backup operation fails after the respective checkpoint 101 has been created and before the next checkpoint 101 has been created. For example, in some embodiments the respective checkpoint 101 may include information indicating which files have been backed up to the backup storage device 40 since the backup operation began. In some embodiments the checkpoints 101 may be stored on a storage medium of the backup server computer system 30. In some embodiments the backup software 100 may delete the checkpoints 101 after the backup operation has been completed.

In various embodiments, the devices illustrated in FIG. 1 may be coupled to each other as shown in any of various ways. In some embodiments the backup storage device 40 may be directly attached to the source device 20, e.g, through a communication bus. In other embodiments the backup storage device 40 may be coupled to the source device 20 through one or more networks. In various embodiments the devices illustrated in FIG. 1 may be coupled via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer or device may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In some embodiments the backup software 100 may communicate with the source device 20 to transfer the data 55 to the backup server computer system 30, and may communicate with the backup storage device 40 to forward the data 55 to the backup storage device 40. In such an embodiment the backup server computer system 30 effectively acts as an intermediate device through which the data 55 is transferred, as indicated by the arrow 12. In other embodiments the backup software 100 may communicate with the source device 20 to cause the source device 20 to transfer the data 55 directly to the backup storage device 40 without transferring the data 55 through the backup server computer system 30. For example, depending on the type of backup storage device 40 and how it is coupled to the source device 20, the source device 20 may or may not be able to transfer the data 55 directly to the backup storage device 40. In yet other embodiments, the backup software 100 may communicate with the source device 20 to cause the source device 20 to transfer the data 55 to another proxy computer system (not shown) which then forwards the data 55 to the backup storage device 40.

Figure 2:
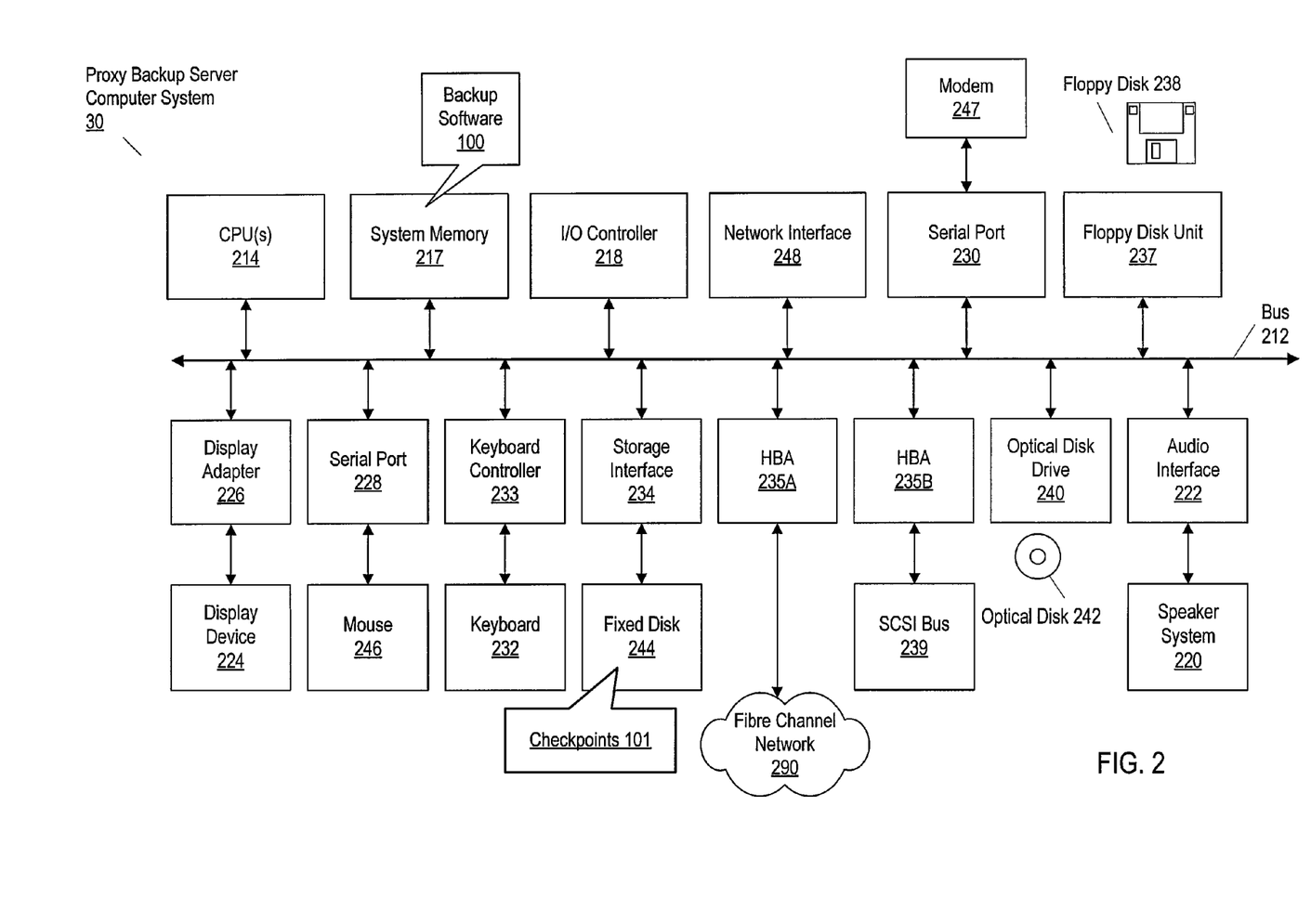
FIG. 2 illustrates an example of a backup server computer system on which the backup software executes according to one embodiment.

In various embodiments the backup server computer system 30 may include any kind of computing device. FIG. 2 illustrates an example of the backup server computer system 30 according to one embodiment. In some embodiments the backup server computer system 30 may include a bus 212 which interconnects major subsystems of the backup server computer system 20, such as one or more central processor units 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

The bus 212 allows data communication between central processor(s) 214 and system memory 217. The system memory 217 may include read-only memory (ROM) or flash memory (neither shown), and random access memory (RAM) (not shown), as previously noted. The RAM is generally the main memory into which the operating system and application programs are loaded, including the backup software 100. The ROM or flash memory can contain, among other code, the Basic Input-Output system (BIOS) which controls basic hardware operation such as the interaction with peripheral components. Applications resident with the backup server computer system 30 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

The storage interface 234, as with the other storage interfaces of the backup server computer system 30, can connect to a standard computer readable medium for storage and/or retrieval of information, such as a fixed disk drive 244. Fixed disk drive 244 may be a part of the backup server computer system 30 or may be separate and accessed through other interface systems. The modem 247 may provide a connection to a remote device via a telephone link or to the Internet via an internet service provider (ISP). The network interface 248 may provide a connection to a remote device via a network link. In some embodiments the network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored on a computer-accessible storage medium such as one or more of system memory 217, fixed disk 244, optical disk 242, or floppy disk 238. The operating system provided on the backup server computer system 30 may be MS-DOS®, MS-WINDOWS®, OS/2®, UNIX®, Linux®, or another operating system.

In some embodiments the backup software 100 may be implemented as a distributed application so that some portions of the backup software 100 execute on the backup server computer system 30 and other portions execute on the source device 20 and/or the backup storage device 40. In other embodiments the system may not use a separate backup server computer system 30. Instead the backup software 100 may execute on the source device 20 and/or the backup storage device 40.

Figure 3:
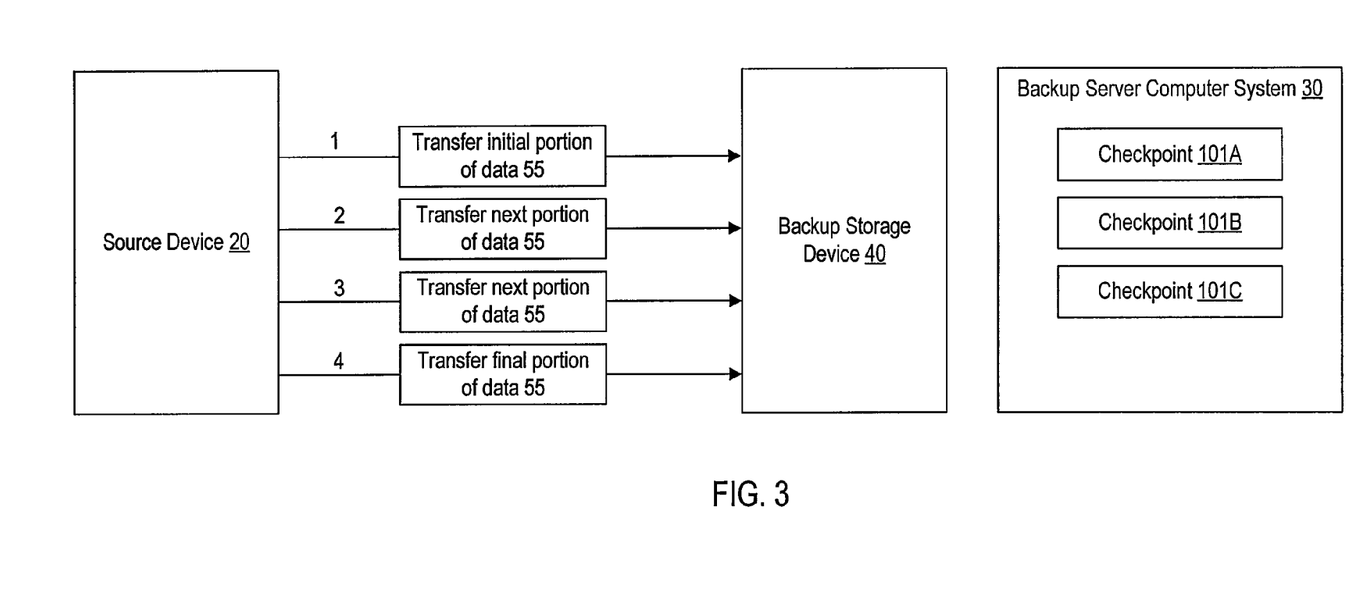
FIG. 3 illustrates an example of performing a backup operation to backup the data from the source device to the backup storage device.

FIG. 3 illustrates an example of performing a backup operation to backup the data 55 from the source device 20 to the backup storage device 40. The backup software 100 may execute on the backup server computer system 30 to communicate with the source device 20 and the backup storage device 40 to control the backup operation. As indicated by the arrow 1, the source device 20 may transfer an initial portion of the data 55 to the backup storage device 40. The backup software 100 may then cause the backup operation to be paused while it creates a checkpoint 101A.

The backup operation may be performed according to a protocol which uses a transfer frame to define how much data to transfer from the source device 20 to the backup storage device 40 between each checkpoint. For example, in some embodiments the Network Data Management Protocol (NDMP) may be used to perform the backup operation. In such an embodiment, the transfer frame may be a transfer frame of the Network Data Management Protocol. When the backup operation begins, the backup software 100 may set the transfer frame size to an initial size. As discussed above, the backup software 100 may enable an administrator of the system to specify a desired checkpoint time interval between checkpoints. Thus, the appropriate transfer frame size is the size that will achieve the desired checkpoint time interval. This size may vary depending on the rate at which the data is transferred from the source device 20 to the backup storage device 40. The backup software 100 may not know the actual data transfer rate before the backup operation begins. Instead, the backup software may estimate the data transfer rate and compute the initial size to which to set the transfer frame size based on the desired checkpoint time interval and the estimated data transfer rate. For example, if the desired checkpoint time interval is 600 seconds and the estimated data transfer rate is 512 kilobits per second (kbps) then the initial size may be computed as:

$$512 \text{ kbps} * 600 \text{ seconds} = 307{,}200 \text{ kilobits}$$

Thus, in this example, after the first 307,200 kilobits of the data 55 have been transferred from the source device 20 to the backup storage device 40, the backup software 100 may pause the data transfer and create the checkpoint 101A.

The backup software 100 may also measure the actual transfer rate at which the first 307,200 kilobits of the data 55 were transferred to the backup storage device 40. For example, the backup software 100 may determine how much time elapsed between the time when the data transfer began and the time when the transfer of the first 307,200 kilobits of the data 55 was completed. Since the amount of data that was transferred (307,200 kilobits) is known and the transfer time is known, the actual transfer rate can be computed.

The backup software 100 may then reset the transfer frame size to a new size based on the desired checkpoint time interval and the actual data transfer rate. For example, if the actual data transfer rate is 400 kbps then the new size for the transfer frame may be computed as:

$$400 \text{ kbps} * 600 \text{ seconds} = 240{,}000 \text{ kilobits}$$

The backup software 100 may then cause the data transfer to resume so that the source device 20 transfers the next portion of data 55 to the backup storage device 40, as indicated by the arrow 2. The size of the next portion of data is defined by the new size of the transfer frame, e.g., 240,000 kilobits in this example. Thus, after the next 240,000 kilobits have been transferred to the backup storage device 40, the backup software 100 may again pause the data transfer, and may create the second checkpoint 101B.

Thus, the time that elapses between the time when the data transfer was initiated and the time when the first checkpoint 101A is created may be shorter or longer than the desired checkpoint time interval, depending on whether the estimated transfer rate was faster or slower than the actual transfer rate. Adjusting the transfer frame size to the new size based on the actual transfer rate may cause the actual checkpoint time interval (the time interval between the times when successive checkpoints are created) to match the desired checkpoint time interval more closely.

When the data transfer is paused to create the second checkpoint 101B, the backup software 100 may re-calculate the actual transfer rate, e.g., based on the actual transfer rate of the data that was transferred between the checkpoint 101A and the checkpoint 101B. The backup software 100 may then reset the transfer frame size again to a new size based on the desired checkpoint time interval and the re-calculated actual transfer rate. Thus, the size of the transfer frame may be adjusted up or down depending on whether the newly calculated actual transfer rate is faster or slower than the previously calculated actual transfer rate.

The above-described process may then be repeated. The backup software 100 may cause the data transfer to resume so that the source device 20 transfers the next portion of data 55 to the backup storage device 40, as indicated by the arrow 3. The data transfer may then be paused while the checkpoint 101C is created. The actual data transfer rate may be adjusted, and the size of the transfer frame may also be adjusted accordingly. The data transfer may then be resumed so that the source device 20 transfers the final portion of data 55 to the backup storage device 40, as indicated by the arrow 4. At this point, the backup operation is complete. In some embodiments the backup software 100 may delete the checkpoints 101 after the backup operation is complete.

The above scenario assumes that the backup operation completes without failure. If a failure occurs then the most recent checkpoint 101 may be used to re-start the backup operation. For example, if the failure occurs after the checkpoint 101A is created and before the checkpoint 101B is created then the backup operation may be re-started from the checkpoint 101A. Thus, the initial portion of the data 55 does not need to be transferred again after the backup operation is re-started. Instead the source device 20 may begin transferring the next portion of the data 55, as indicated by the arrow 2. Similarly, if the failure occurs after the checkpoint 101C is created and before the transfer of the final portion of the data 55 has completed then the backup operation may be re-started from the checkpoint 101C. Thus, when the backup operation re-starts, the source device 20 may begin transferring the final portion of data 55 again as indicated by the arrow 4, without re-transferring the previously transferred portions of the data 55.

Thus, in some embodiments the backup software 100 may operate to dynamically adjust the transfer frame size between each checkpoint 101 in order to cause the actual checkpoint time interval to match the desired checkpoint time interval specified by the administrator. If the actual transfer rate remains fairly constant then the transfer frame size may also remain fairly constant (except for possibly the initial transfer frame size adjustment after the initial portion of data has been transferred). On the other hand, if the transfer rate varies significantly during the course of the backup operation (e.g., due to dynamically changing network traffic or other load factors) then the transfer frame size may also be adjusted significantly between checkpoints.

In various embodiments, any of various algorithms may be used to re-calculate the actual transfer rate when checkpoint is created. For example, in some embodiments the algorithm may take into account the transfer rate for all of the data that has been transferred so far when re-calculating the actual transfer rate. In other embodiments the algorithm may only consider the transfer rate of the portion of data transferred to the backup storage device 40 since the last checkpoint. In other embodiments the algorithm may use a sliding window, e.g., such that the actual transfer rate is reset to the actual transfer rate of the N most recently transferred bits. In other embodiments, any of various other algorithms or heuristics may be used to re-calculate the actual transfer rate between each checkpoint.

Figure 4:
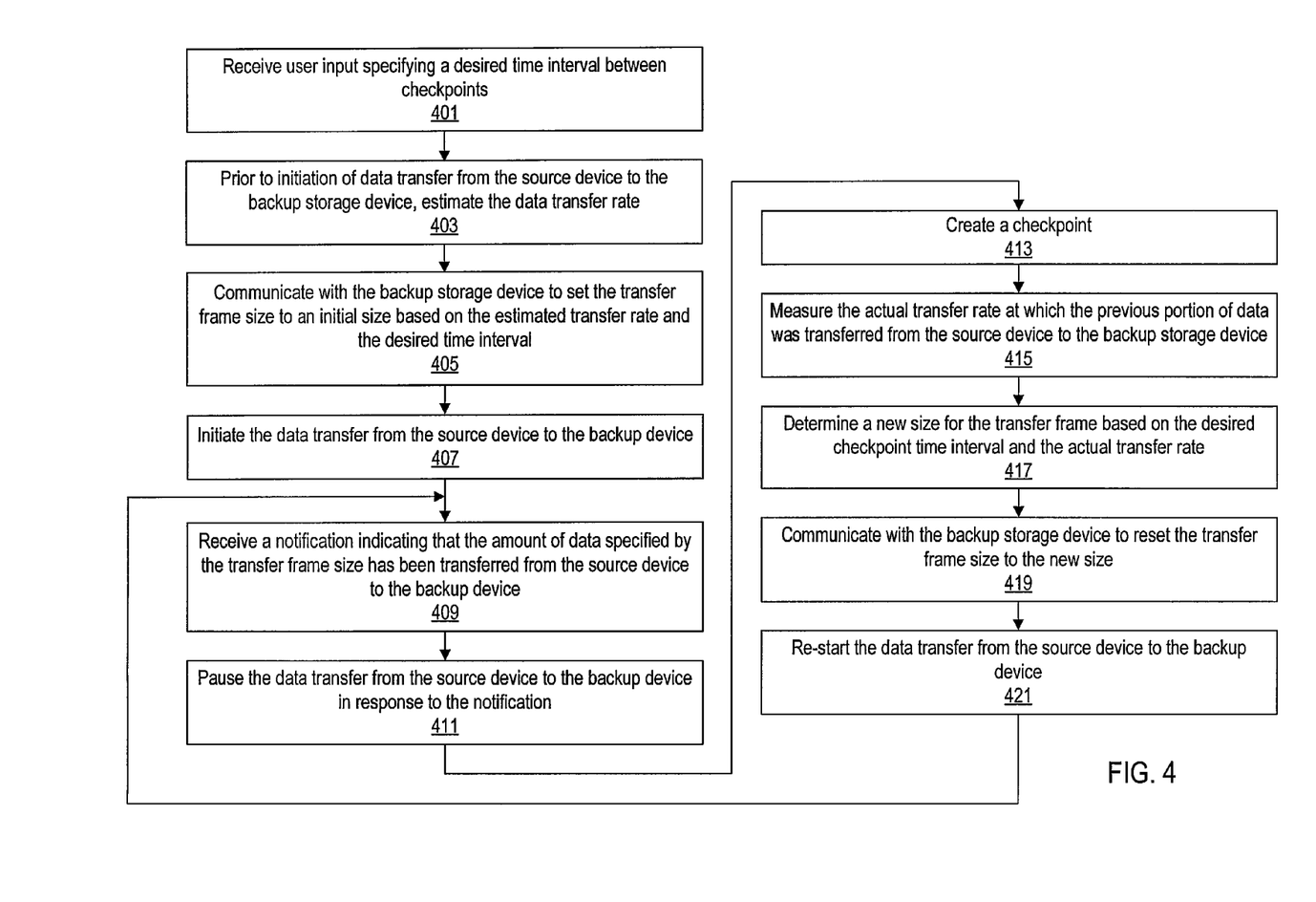
FIG. 4 is a flowchart diagram illustrating one embodiment of a method for controlling a backup operation to backup data from a source device to a backup storage device.

FIG. 4 is a flowchart diagram illustrating one embodiment of a method for controlling a backup operation to backup data from a source device to a backup storage device. The method may be implemented by the backup software 100. It is noted that FIG. 4 represents one particular embodiment of the method, and numerous aspects of the method may be altered in other embodiments.

As indicated in block 401, the backup software 100 may receive user input specifying a desired time interval between checkpoints. For example, the backup software 100 may display a graphical user interface for an administrative tool which allows a user (e.g., the system administrator) to specify the desired checkpoint time interval.

As indicated in block 403, prior to initiation of data transfer from the source device 20 to the backup storage device 40, the backup software 100 may estimate the data transfer rate. In some embodiments the backup software 100 may take various system configuration factors into account when estimating the data transfer rate, such as the network topology (e.g., how the backup storage device 40 is coupled to the source device 20), the type of network or other connection used to transfer the data, the type of backup storage device 40 and/or the type of the source device 20, the maximum possible write speed of the backup storage device 40, etc. In other embodiments the backup software 100 may simply estimate the data transfer rate as a fixed rate without taking these types of factors into account.

As indicated in block 405, in some embodiments the backup software 100 may then communicate with the backup storage device 40 to set the transfer frame size to an initial size based on the estimated transfer rate and the desired time interval. For example, if the NDMP protocol is used then the backup software 100 may use an application programming interface (API) of the NDMP protocol to set the transfer frame size on the backup storage device 40.

As indicated in block 407, the backup software 100 may then initiate the transfer of the data from the source device 20 to the backup device 40. In some embodiments the data transfer may be initiated by communicating with the source device 20 to cause the source device 20 to begin transferring the data.

As indicated in block 409, the backup software 100 may subsequently receive a notification indicating that the amount of data specified by the transfer frame size has been transferred from the source device 20 to the backup device 40. In some embodiments the backup software 100 may receive the notification from the backup storage device 40. In other embodiments the backup software 100 may receive the notification from the source device 20. In yet other embodiments the backup software 100 may not receive the notification from another device, but instead, a software module executing on the backup server computer system 30 may monitor the data transfer and notify the backup software 100 when the transfer frame size amount has been transferred to the backup storage device 40.

As indicated in block 411, the backup software 100 may pause the data transfer from the source device 20 to the backup device 40 in response to the notification. In some embodiments the backup software 100 may communicate with the source device 20 to cause the source device 20 to pause the data transfer.

As indicated in block 413, the backup software 100 may then create a checkpoint, e.g., by storing information enabling the backup operation to be re-started from the checkpoint. In some embodiments the checkpoint may include information indicating which files have been backed up to the backup storage device 40 since the backup operation began. For example, in some embodiments the backup software 100 may query the source device 20 to receive a list of all the files that have been backed up to the backup storage device 40 since the backup operation began. The backup software 100 may store the list of files in the checkpoint, as well as storing any other information needed to enable the backup operation to be re-started without backing up those files again.

As indicated in block 415, the backup software 100 may measure or calculate the actual transfer rate at which the previous portion of data was transferred from the source device 20 to the backup storage device 40. The backup software 100 may then determine a new size for the transfer frame based on the desired checkpoint time interval and the actual transfer rate, as indicated in block 417.

As indicated in block 419, the backup software 100 may then communicate with the backup storage device 40 to reset the transfer frame size to the new size. The backup software 100 may then re-start the data transfer from the source device 20 to the backup device 40, as indicated in block 421.

The above-described functions of blocks 409, 411, 413, 415, 417, 419 and 421 may then be repeated. Thus, at each checkpoint the backup software 100 may dynamically adjust the transfer frame size as necessary in order to cause the actual time between checkpoints to match the desired checkpoint time interval specified by the user. The process may be repeated until all of the data has been transferred from the source device 20 to the backup storage device 40, at which time the backup operation is complete.

Figure 5:
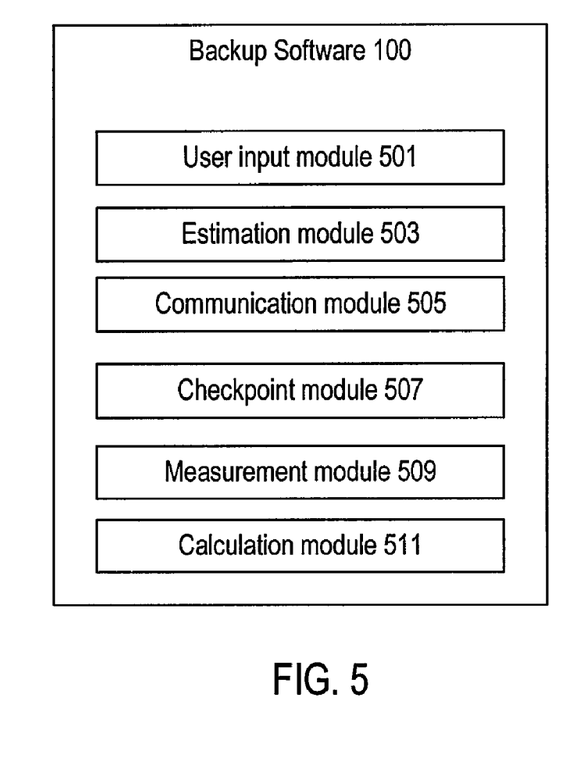
FIG. 5 illustrates the backup software in detail.

FIG. 5 illustrates the backup software 100 in more detail. In the illustrated embodiment, the backup software 100 includes: a user input module 501 executable to perform the functionality of receiving the user input specifying the desired checkpoint time interval; an estimation module 503 executable to perform the functionality of estimating the data transfer rate prior to initiation of the data transfer; a checkpoint module 507 executable to perform the functionality of creating the checkpoints; a measurement module 509 executable to perform the functionality of measuring the actual transfer rate at which the data is transferred from the source device 20 to the backup storage device 40; a calculation module 511 executable to perform the functionality of calculating and re-calculating the size of the transfer frame based on the desired checkpoint time interval and the estimated or actual transfer rate; and a communication module 505 executable to perform the functionality of communicating with the source device 20 and the backup storage device 40. For example, in some embodiments the communication module 505 may perform functions such as: communicating with the backup storage device 40 to set or reset the transfer frame size; communicating with the source device 20 to cause the source device 20 to pause or resume data transfer; communicating with the backup storage device 40 to receive the notifications indicating that the amount of data specified by the transfer frame size has been transferred; etc.

Various embodiments of a method for controlling a backup operation to backup data from a source device to a backup storage device have been described above. The method is implemented by various devices operating in conjunction with each other, and causes a transformation to occur in one or more of the devices. For example, the backup storage device is transformed by storing the backup copy of the data on the backup storage device.

It is noted that various functions described herein may be performed in accordance with cloud-based computing techniques or software as a service (Saas) techniques in some embodiments. For example, in some embodiments the functionality of the backup software 100 may be provided as a cloud computing service.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A non-transitory computer-accessible and computer-readable storage medium storing program instructions are executable by one or more processors to:
   control a backup operation that uses a plurality of checkpoints to backup data from a source device to a backup storage device, wherein in controlling the backup operation the program instructions are executable to:
   set a transfer frame size to a particular size, wherein the transfer frame size specifies an amount of data to be written between the checkpoints of the backup operation;
   determine a desired checkpoint time interval which specifies a desired amount of elapsed time between the checkpoints of the backup operation;
   measure an actual transfer rate at which data is transferred from the source device to the backup storage device;
   determine a new size to which to set the transfer frame size using the desired checkpoint time interval and the actual transfer rate; and
   reset the transfer frame size to the new size.

2. The non-transitory computer-accessible and computer-readable storage medium of claim 1, wherein the program instructions are further executable to:
   prior to initiation of data transfer from the source device to the backup storage device, estimate a transfer rate of data transfer from the source device to the backup storage device; and
   use the desired checkpoint time interval and the estimated transfer rate to determine the particular size to which to set the transfer frame size.

3. The non-transitory computer-accessible and computer-readable storage medium of claim 2,
   wherein the program instructions are executable to set the transfer frame size to the particular size prior to initiation of data transfer from the source device to the backup storage device.

4. The non-transitory computer-accessible and computer-readable storage medium of claim 1, wherein the program instructions are further executable to:
   create the checkpoints of the backup operation, wherein creating each respective checkpoint includes storing information enabling the backup operation to be re-started from the respective checkpoint.

5. The non-transitory computer-accessible and computer-readable storage medium of claim 1,
   wherein the program instructions are executable to perform the backup operation using a Network Data Management Protocol (NDMP);
   wherein the transfer frame size is a transfer frame size used by the Network Data Management Protocol to control an amount of data written between checkpoints of the backup operation.

6. The non-transitory computer-accessible and computer-readable storage medium of claim 1,
   wherein the transfer frame size is used by the backup storage device;
   wherein the program instructions are executable to set the transfer frame size to the particular size by communicating with the backup storage device to cause the backup storage device to set the transfer frame size to the particular size;
   wherein the program instructions are executable to reset the transfer frame size by communicating with the backup storage device to cause the backup storage device to reset the transfer frame size.

7. The non-transitory computer-accessible and computer-readable storage medium of claim 1, wherein the program instructions are executable to:
   determine the new size to which to set the transfer frame size by multiplying the desired checkpoint time interval by the actual transfer rate.

8. The non-transitory computer-accessible and computer-readable storage medium of claim 1, wherein the program instructions are executable to:
   receive user input specifying the desired checkpoint time interval between checkpoints of the backup operation.

9. The non-transitory computer-accessible and computer-readable storage medium of claim 8, wherein the program instructions are executable to:
 display a graphical user interface for configuring backup operations;
 receive the user input specifying the desired checkpoint time interval between the checkpoints of the backup operation via the graphical user interface.

10. The non-transitory computer-accessible and computer-readable storage medium of claim 1, wherein the program instructions are executable to:
 set the transfer frame size to the particular size prior to initiation of data transfer from the source device to the backup storage device;
 receive a first notification from the backup storage device indicating that an amount of data specified by the particular size has been received by the backup storage device; and
 in response to the notification, measure the actual transfer rate by determining an amount of time elapsed between a time when data transfer to the backup storage device was initiated and a time when the amount of data specified by the particular size was received by the backup storage device.

11. The non-transitory computer-accessible and computer-readable storage medium of claim 10,
 wherein the backup storage device is configured to pause from writing data in response to determining that the amount of data specified by the particular size has been received by the backup storage device;
 wherein the program instructions are executable to:
  create a first checkpoint after receiving the notification from the backup storage device; and
  re-start the data transfer from the source device to the backup storage device after creating the first checkpoint.

12. The non-transitory computer-accessible and computer-readable storage medium of claim 11,
 wherein the actual transfer rate is a first actual transfer rate;
 wherein the new size is a first new size;
 wherein the program instructions are further executable to:
  subsequently to re-starting the data transfer, receive a first notification from the backup storage device indicating that an amount of data specified by the first new size has been received by the backup storage device;
  determine a second actual transfer rate at which data was transferred from the source device to the backup storage device between a time when the data transfer was re-started and a time when the amount of data specified by the first new size was received by the backup storage device;
  determine a second new size to which to set the transfer frame size using the desired checkpoint time interval and the second actual transfer rate; and
  reset the transfer frame size to the second new size.

13. The non-transitory computer-accessible and computer-readable storage medium of claim 1,
 wherein resetting the transfer frame size to the new size causes an actual amount of elapsed time between checkpoints of the backup operation to match the desired amount of elapsed time.

14. A computer-implemented method comprising:
 a computer system controlling a backup operation that uses a plurality of checkpoints to backup data from a source device to a backup storage device, wherein controlling the backup operation includes:
  the computer system determining a desired checkpoint time interval which specifies a desired amount of elapsed time between the checkpoints of the backup operation;
  the computer system setting a transfer frame size to an initial size, wherein the initial size specifies an amount of data to be written to the backup storage device before a first checkpoint for the backup operation is created;
  the computer system initiating data transfer from the source device to the backup device;
  the computer system receiving a first notification indicating that the amount of data specified by the initial size has been transferred from the source device to the backup device;
  the computer system pausing the data transfer from the source device to the backup device in response to the first notification;
  the computer system creating a first checkpoint by storing information enabling the backup operation to be re-started from the first checkpoint;
  the computer system measuring a first actual transfer rate at which data was transferred from the source device to the backup storage device between a time when the data transfer was initiated and a time when the amount of data specified by the initial size was transferred to the backup device from the source device;
  the computer system determining a first new size to which to set the transfer frame size using the desired checkpoint time interval and the first actual transfer rate;
  the computer system resetting the transfer frame size to the first new size, wherein the first new size specifies an amount of data to be written to the backup storage device before a second checkpoint for the backup operation is created; and
  the computer system re-starting the data transfer from the source device to the backup device after the transfer frame size has been reset to the first new size.

15. The computer-implemented method of claim 14, wherein controlling the backup operation further includes:
 the computer system receiving a second notification indicating that the amount of data specified by the first new size has been transferred from the source device to the backup device;
 the computer system pausing the data transfer from the source device to the backup device in response to the second notification;
 the computer system creating a second checkpoint by storing information enabling the backup operation to be re-started from the second checkpoint;
 the computer system measuring a second actual transfer rate at which data was transferred from the source device to the backup storage device between a time when the data transfer was re-started and a time when the amount of data specified by the first new size was transferred to the backup device from the source device;
 the computer system determining a second new size to which to set the transfer frame size using the desired checkpoint time interval and the second actual transfer rate;
 the computer system resetting the transfer frame size to the second new size, wherein the second new size specifies an amount of data to be written to the backup storage device before a third checkpoint for the backup operation is created; and the computer system re-starting the data transfer from the source device to the backup device after the transfer frame size has been reset to the second new size.

16. The computer-implemented method of claim 14, wherein controlling the backup operation further includes:

prior to initiating the data transfer from the source device to the backup storage device, the computer system estimating a transfer rate of data transfer from the source device to the backup storage device; and the computer system using the desired checkpoint time interval and the estimated transfer rate to determine the initial size to which to set the transfer frame size.

17. A system comprising:

one or more processors; and memory storing program instructions;

wherein the program instructions are executable by the one or more processors to control a backup operation that uses a plurality of checkpoints to backup data from a source device to a backup storage device, wherein in controlling the backup operation the program instructions are executable by the one or more processors to:

set a transfer frame size to a particular size, wherein the transfer frame size specifies an amount of data to be written between the checkpoints of the backup operation;

determine a desired checkpoint time interval which specifies a desired amount of elapsed time between the checkpoints of the backup operation;

measure an actual transfer rate at which data is transferred from the source device to the backup storage device;

determine a new size to which to set the transfer frame size using the desired checkpoint time interval and the actual transfer rate; and reset the transfer frame size to the new size.

18. The system of claim 17, wherein the program instructions are further executable by the one or more processors to:

prior to initiation of data transfer from the source device to the backup storage device, estimate a transfer rate of data transfer from the source device to the backup storage device; and use the desired checkpoint time interval and the estimated transfer rate to determine the particular size to which to set the transfer frame size.

\* \* \* \* \*